United States Patent [19]
Masuda

[11] Patent Number: 5,611,568
[45] Date of Patent: Mar. 18, 1997

[54] FRAME STRUCTURE OF VEHICLE BODY

[75] Inventor: Toshio Masuda, Tochigi, Japan

[73] Assignee: Fuji Jukogyo Kabushiki Kaisha, Tokyo, Japan

[21] Appl. No.: 557,728

[22] Filed: Nov. 13, 1995

[30] Foreign Application Priority Data

Dec. 15, 1994 [JP] Japan .................................. 6-333360

[51] Int. Cl.⁶ ...................................................... B62D 7/22
[52] U.S. Cl. ............................................................. 280/784
[58] Field of Search ............................................... 280/784

[56] References Cited

U.S. PATENT DOCUMENTS

| | | | |
|---|---|---|---|
| 3,860,258 | 1/1975 | Feustel et al. | 280/784 |
| 3,912,295 | 10/1975 | Eggert, Jr. | 280/784 |
| 4,152,012 | 5/1979 | Reidelbach et al. | 280/784 |
| 5,194,199 | 3/1993 | Thum | 264/46.6 |
| 5,429,388 | 7/1995 | Wheatlet et al. | 280/784 |

Primary Examiner—Kenneth R. Rice
Attorney, Agent, or Firm—Beveridge, DeGrandi, Weilacher & Young, L.L.P.

[57] ABSTRACT

A front frame structure of a cab over type vehicle comprises a side member provided in a longitudinal direction of the vehicle, an aluminum-made frame section connected with the front end of the side member, a front cross member connected with the front end of the frame section, a front bumper provided adjacent to the he front cross member, and an aluminum foam inserted in the frame section. When a head-on impact is applied to the vehicle body, an impact energy is transmitted to the aluminum-made frame section through the bumper and the front cross member and the frame section is subjected to a buckling deformation together with the aluminum foam contained therein. The impact energy can be effectively absorbed within a small crush space of the vehicle.

23 Claims, 4 Drawing Sheets

FRAME STRUCTURE OF VEHICLE BODY

BACKGROUND OF THE INVENTION

1. Field of the Invention

The present invention relates to a frame structure of a vehicle body and particularly to a front frame structure of a cab over type vehicle with a chassis frame.

2. Prior Art

Generally, in cab over type vehicles, it is difficult to secure an enough space to absorb impact energy in an event of a head-on collision and therefore it is necessary to absorb impact energy with a far smaller crash stroke than in a bonnet type vehicle. It is well known that a chassis frame structure is effective for this purpose because left and right lengthwise side members of the chassis frame absorb impact energy by collapsing of these side members longitudinally.

However, in the frame structure comprising side members and a front bumper directly connected with the front ends thereof from behind, in the event of the head-on collision, since the impact shock is transferred to the side members directly and momentally, sensing of an impact sensor for an air bag system tends to be excessively sensitive regardless of the magnitude of impact. Because of this, it is very difficult to determine a no-firing zone in which the air bag does not operate when a small or medium collision occurs.

In order to solve this problem, Japanese Unexamined Utility Model Application No. Jitsu-Kai-Hei 5-012361 discloses a technique in which a plurality of ribs are disposed in the side member in the perpendicular direction therewith and thin wall sections are provided at portions near the root of the ribs so that the side member collapses more easily in the lengthwise direction of the vehicle for reducing the resistance of impact at the initial stage of a collision.

These means of using the collapsible side member of the chassis frame can be applied to the bonnet type vehicle which is capable of securing an enough crush stroke therein but can not be applied to the cab over type vehicle which must absorb impact energy within a very small crash stroke. Consequently, in the cab over type vehicle having a chassis frame, generally the front bumper overhanged ahead at a given distance from the front end of the side member (front cross member) and the front part of the cabin absorb impact energy by the deformation of the both when a small or medium impact is subjected.

However, this overhang type structure includes miscellaneous disadvantages such as a lack of resistance at the initial stage of a collision, a delay of rise of impact load, an upsizing of the bumper, an unsteady absorption of impact energy and an obscure sensing of the impact sensor.

SUMMARY OF THE INVENTION

The present invention is intended to obviate those disadvantages of the prior arts and it is an object of the present invention to provide a front frame structure capable of absorbing impact energy efficiently within a limited crush space and of sensing an impact properly for a stable operation of an air bag. It is another object of the present invention to provide a front frame structure in which a fine control is available in finding a proper timing for the air bag operation even with a cab over type vehicle having a small crush space.

In order to achieve these objects, the front frame structure according to the present invention comprises:

an impact absorption member provided at the front end of a side member of the vehicle;

a front cross member provided at the front end of the impact absorption member;

an aluminum foam inserted in the impact absorption member; and an impact sensor embedded in the aluminum foam.

BRIEF DESCRIPTION OF THE DRAWINGS

The present invention will be understood more fully from the accompanying drawings of the preferred embodiment of the invention, in which.

DETAILED DESCRIPTION OF THE PREFERRED EMBODIMENTS

Embodiments according to the present invention will be described in detail with reference to the accompanying drawings.

Figure 1A:
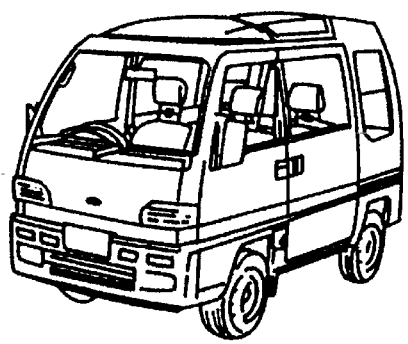
FIG. 1A is a perspective view of a cab-over vehicle having a chassis frame, FIG. 1B plan view showing a front part of a chassis frame
Figure 1B:
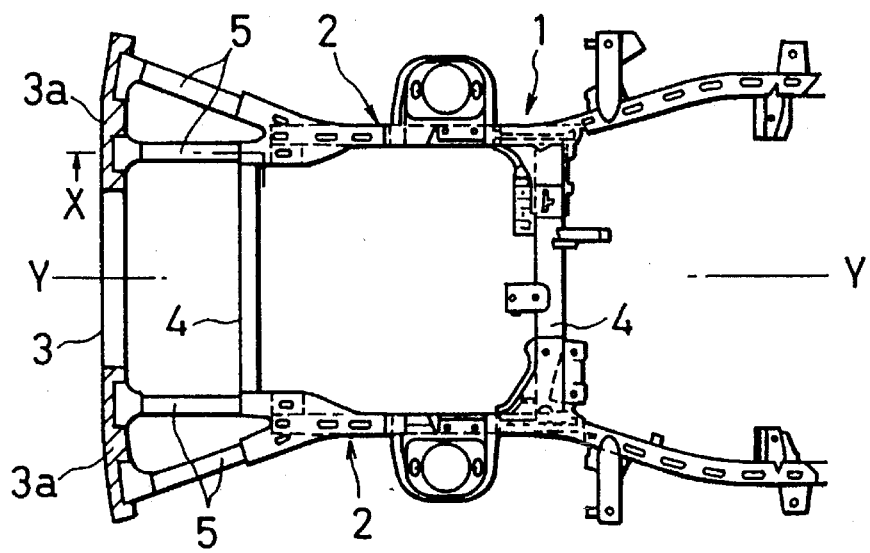
FIG. 1C is an expanded sectional view of the X—X section in FIG. 1B.

Referring now to FIG. 1B, a chassis frame 1 comprises a left and right side member 2, 2, a front cross member 3 connected with a front end of the side members 2, 2 and a plurality of cross members 4. The chassis frame 1 is composed of pipes (generally, made of steel) having a square cross section. The left and right side member 2 is branched into an outer side member slanted outside with a given angle and an inner side member extended approximately in parallel with a body center line Y—Y. The outer and inner side members include an impact absorption member 5 respectively.

The impact absorption member 5 comprises a frame section 51 made of aluminum (including aluminum alloy) square pipes with thin wall and an aluminum foam 52 inserted therein. At the front end of the frame section 5 there is provided a cross member mounting section 51a which is formed in a U-shape. To the cross member mounting section 51a a front cross member 3 composed of extrusion shaped aluminum (including aluminum alloy) is fastened by through bolts and nuts.

Here, the well known manufacturing process of aluminum foam will be explained briefly: first melting aluminum or aluminum alloy, then adding thickener (for example a specified amount of calcium) to melted aluminum and stirring it for thickening, then adding foaming agent (for example, a specified amount of titanium hydroxide) and stirring again, then foaming in a closed container. Thus obtained block of aluminum foam has a high density (relatively hard) and is nonhomogenious at the portion near the inner wall of the container, namely the portion near the margin thereof because of insufficient foaming, and therefore generally, only the portion near the center of the block is cut out of the block and used for acoustic material or heat insulating material because it has a low density (relatively soft) and is homogeneous.

In this embodiment, specified amounts of thickener and foaming agent are added to melted aluminum or melted aluminum alloy and then this melted aluminum or aluminum alloy are put into the frame section 51 for foaming therein. Consequently, the block of aluminum foam 52 obtained in the frame section 51 according to the process based on this embodiment is composed of a relatively hard portion with high density near the surface thereof and a relatively soft portion with low density near inside thereof.

Figure 2:
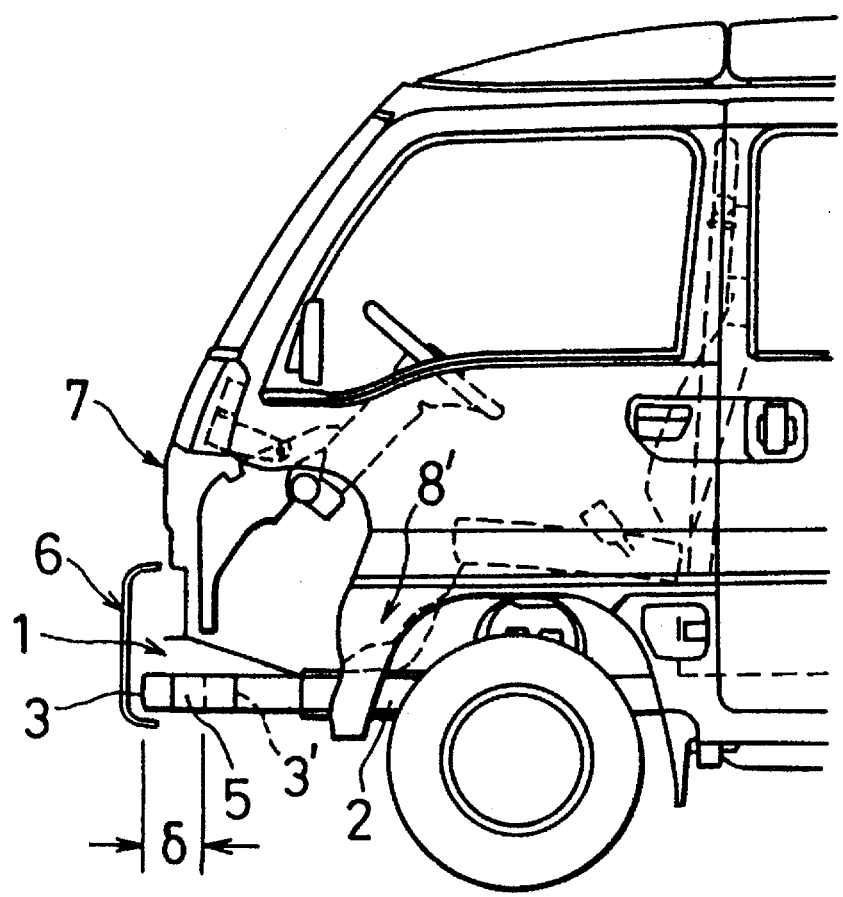
FIG. 2 is a side view of a vehicle shown in FIG. 1A.

Thus constituted impact absorption member 5 is connected with the front end of the side member 2 by bolts and nuts and further the front cross member 3 is fastened to the front end of the impact absorption member 5 by bolts and nuts. Further, as shown in FIG. 2, a front bumper 6 is installed adjacent to the front cross member 3. A broken line 3' shown in FIG. 2 indicates a position of the front cross member according to the prior art. Therefore, in the prior art, a crash space shown by δ between the front bumper 6 and the cross member 3' absorbs an impact energy by the deformation of the front bumper 6 and the front part of the cabin 7.

When a head-on impact is applied to the vehicle, the impact load is inputted to the chassis frame 1 through the front bumper 6. Then, at the initial stage of the impact, the inputted impact load is absorbed by the buckling deformation of the front cross member 3 and the impact absorption member 5 which forms the front part of the side member.

When the impact absorption member 5 is collapsed, since the aluminum foam 52 inserted in the aluminum-made frame section has a hard layer near the surface thereof, an appropriate initial resistance force and a stable buckling deformation are given to the impact absorption member 5 according to the magnitude of the impact. As a result, the sensing of the impact sensor is performed accurately and therefore a so-called no-fire zone can be securedly estimated.

Figure 1C:
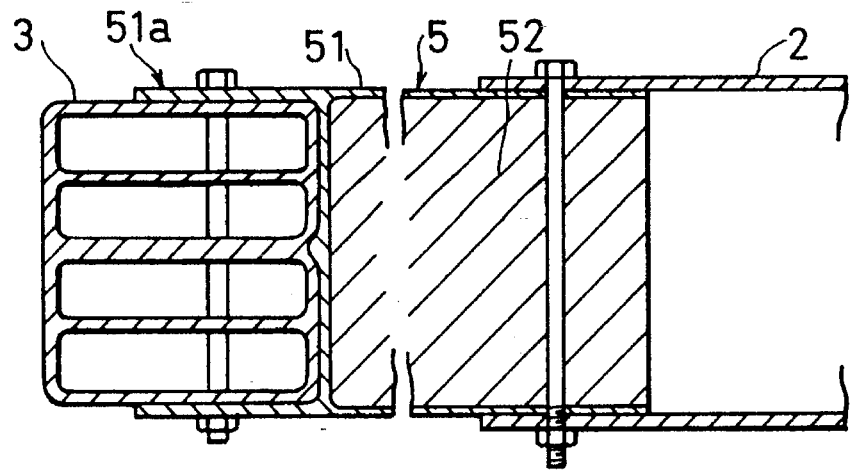

In the embodiment shown in FIG. 1C, the impact absorption member 5 is constituted such that the aluminum foam 52 is made from melted aluminum in the frame section 51. However, as a variation of the first embodiment, it is possible to constitute the impact absorption member 5 such that the aluminum foam 52 is made in a different container whose size is larger than that of the frame section 51, then the block of the aluminum foam thus obtained is cut out into a size fit for the inside figure of the frame section 51 and inserted therein. In this case, the aluminum foam 52 to be inserted into the frame section 51 can be constituted so as to have a low density at the front part thereof and to become gradually higher in density as coming near to the rear part thereof. In the present invention, this variation will be shown in FIG. 3A through FIG. 3C as a second embodiment.

Figure 3A:
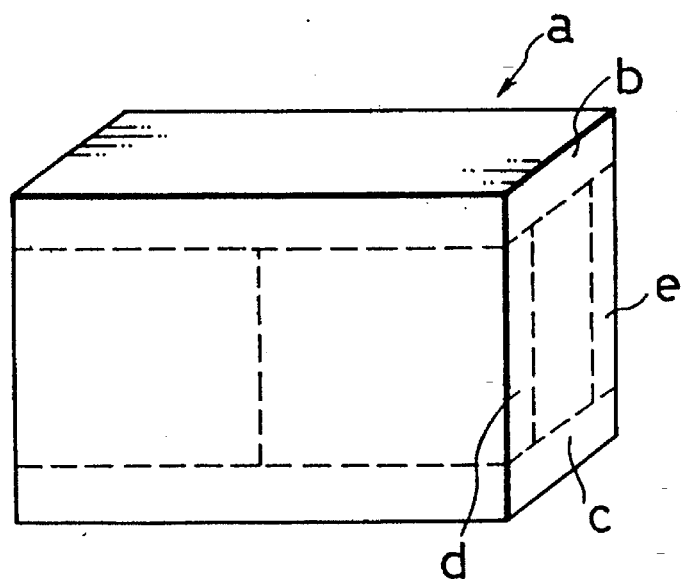
FIG. 3A is a perspective view showing a block of aluminum foam which is made in a container other than a frame section according to a second embodiment.

That is to say, first an aluminum foam block "a" as shown in FIG. 3A is made in a container whose size is more than twice of that of the frame section 51. The aluminum foam block "a" has a high density at the portion near the inner wall of the container and a low density at the portion near the center. The distribution of the density is determined by the foaming characteristic.

Figure 3B:
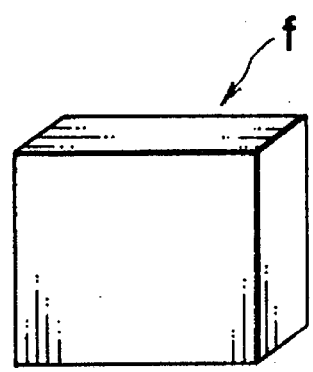
FIG. 3B is a perspective view showing an example of an aluminum foam shaped into a size fit for an impact absorption member from the block illustrated in FIG. 3A
Figure 3C:
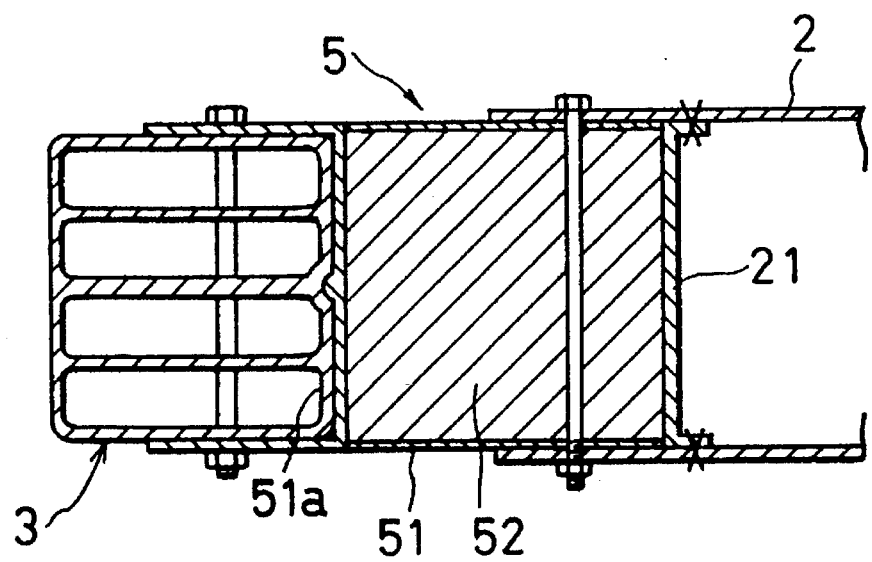
FIG. 3C is a perspective view showing a front part of a chassis frame into which an impact absorption member is inserted using the aluminum foam illustrated in FIG. 3B.

An upper and lower portion "b" and "c" with a high density and a both side portion "d" and "e" with a high density are cut off from the aluminum foam block "a" and the residual portion is cut into two pieces "f" and "f" so as to fit for the frame section 51, as illustrated in FIG. 3B. This aluminum foam "f" is constituted such that one end portion thereof is homogeneous and low in density and the portion coming near the other end thereof becomes gradually high in density. As shown in FIG. 3C, this aluminum foam block "a" is inserted into the frame section 51 with the low density portion faced ahead. Thus constituted impact absorption member 5 is fastened by bolts and nuts at the rear end thereof to the front end of the side member 2. The cross member mounting section 51a of the front part of the impact absorption member 5 is fastened by bolts and nuts to the front cross member 3. A supporting plate 21 is connected by welding with the inside of the side member 2 beforehand. The impact absorption member 5 is fastened by bolts and nuts to the side member 2 in such a state that the supporting plate 21 hits against both the rear edge of the frame section 51 and the rear face of the aluminum foam 52 with a high density.

Similarly to the first embodiment, as shown in FIG. 3C, the chassis frame 1 thus including the impact absorption member 5 and the side member 2 at the front part thereof is connected with the front cross member 3 and the front bumper 6 is installed adjacent to the front cross member 3.

According to the second embodiment, similarly to the first embodiment, when a light or medium head-on collision is applied to the vehicle, since the front cross member 3 and the impact absorption member 5 are subjected to the buckling deformation, no-fire zone where the impact sensor for the air bag does not operate can be estimated definitely. Further, in this second embodiment, since the aluminum foam 52 inserted into the frame section 51 includes a low density portion at the front thereof and a higher density coming near the rear end and further the frame section 51 is supported at the rear end edge thereof by the supporting plate 21, the collapse of the impact absorption member 5 proceeds with a gradually increasing resistance from the front to the rear thereof, whereby the impact energy is absorbed effectively.

Figure 4:
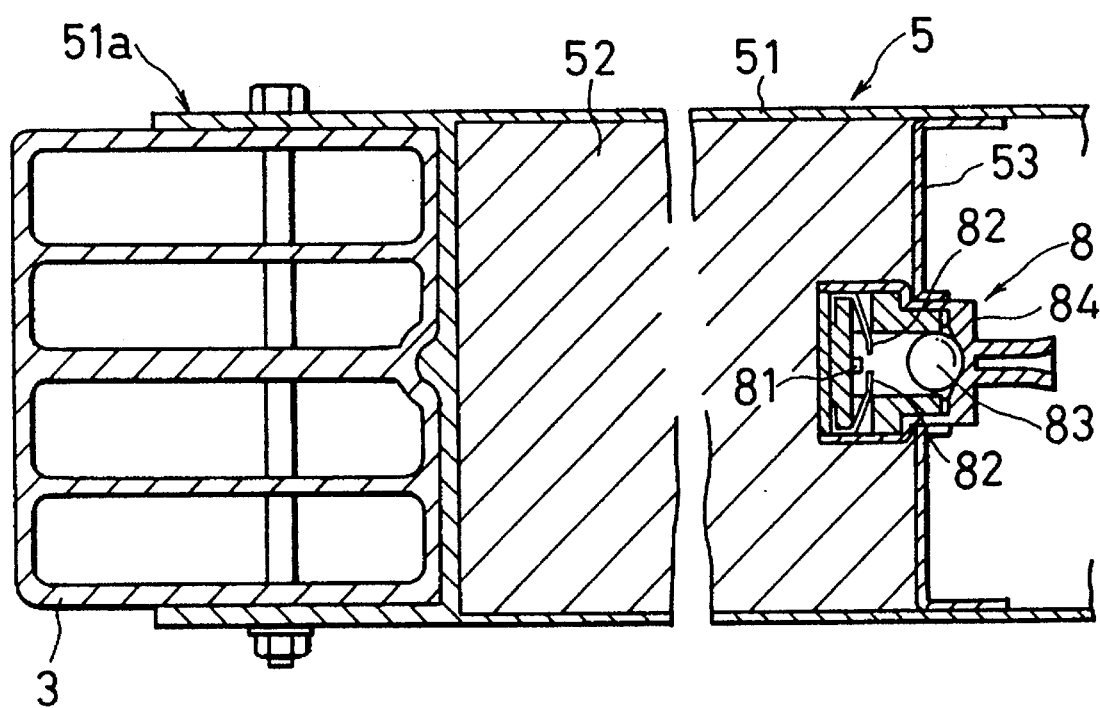
FIG. 4 is a sectional view showing a X—X section in FIG. 1B according to a third embodiment.

Referring to FIG. 4, this example shows a third embodiment according to the present invention. In which, an impact sensor 8 for the air bag is built in the aluminum foam 52 of the impact absorption member 5. The constructions other than this are the same as those in FIG. 1B and FIG. 1C. Generally, in the cab-over vehicle having a chassis frame, the impact sensor is installed on the floor section of the cabin (numeral 8' of FIG. 2 presents a position where the impact sensor is installed in the prior art). However, in this position it is difficult to find a subtle sensing timing because the impact load is partially transmitted to the impact sensor in the process of the impact load being dispersed broadly to sections in the cabin. That is to say, generally, it is necessary to establish a very subtle time lag of the operation of the air bag between the air bag for the driver's seat and the one for the passenger's seat because of the difference in the volume of the air bag between the driver's seat and the passenger's seat. Hence, disposing the impact sensor on the floor the prior art makes it almost impossible to obtain an accurate sensing timing of the impact sensor.

It is an object of the third embodiment to solve this disadvantage. As described above, in the construction constituted such that the impact absorption member comprises the frame section 51 provided at the front part of the side member of the chassis frame 1 and made of a thin-walled aluminum pipe and the aluminum foam 52 inserted into the flame section 51, the impact sensor 8 is embedded inside the aluminum foam 52 of the impact absorption member 5. In this construction, since the impact load inputted from the front end of the impact absorption member 5 is transferred directly to the impact sensor 8, it is possible to establish an accurate and subtle timing of the operation of the air bag for the driver's seat and the passenger's seat respectively.

In the embodiment shown in FIG. 4, the impact sensor 8 comprises a fixed contact 81, movable contacts 82, 82, a moving tip 83 and a housing 84. When a collision occurs the moving tip 83 moves forward and makes the movable contacts 82, 82 contact with the fixed contact 81, whereby an electric signal is generated.

Next, it will be described how the impact sensor 8 is installed onto the aluminum foam 52. In the embodiment as shown in FIG. 4, first the main body of the impact sensor 8 is fitted to a sensor supporting plate 53, then the melted aluminum is poured into the frame section 51 and is covered over by the sensor supporting plate 53 together with the sensor main body. Then, the melted aluminum is foamed in the frame section 51 after the sensor supporting plate 53 is fixed to the frame section 51 and the aluminum foam 52 is obtained. On the other hand, as another variation of this embodiment the aluminum foam 52 may be filled behind the sensor supporting plate 53 in addition to the state shown in FIG. 4. In this case the whole body of the impact sensor 8 is embedded in the aluminum foam 52. Further, in applying the impact sensor like this to the second embodiment shown in FIG. 3C, there may exist a construction that the impact sensor 8 is fitted to a hollow which has been formed before-hand in the aluminum foam 52 and it is fixed to the sensor supporting plate 21.

Further, in the aforementioned embodiments, portions 3a of the front cross member 3 may be filled with aluminum foam inside thereof. Furthermore, the frame section 51 of the impact absorption member 5 may be made from materials other than aluminum, such as steel pipes. In this case the thickness of the pipe wall may be smaller than that of the side member (generally made of steel) so that the frame section 51 is easily collapsed in the lengthwise direction. Further, the material of the front cross member 3 is not limited to aluminum (including aluminum alloy). When steel is substituted for aluminum, the connections between the front cross member 3 and the impact absorption member 5 or between the impact absorption member 5 and the side member 2 can be performed by welding in place of bolts and nuts.

In summary, according to the present invention, in the cab-over vehicle with the chassis frame, the chassis frame is constituted by the impact absorption member provided at the front part of the chassis frame and composed of the thin-walled collapsible pipe and the aluminum foam inserted therein, and the front cross member provided immediately behind the bumper and connected with the front end of the impact absorption member. When a head-on impact is applied to the vehicle, an appropriate initial resistance and a stable buckling deformation are obtained by this constitution. Further, an accurate operational timing of the air bag can be secured.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A front frame structure of a vehicle having, a side member longitudinally provided on the left and right sides of said vehicle respectively, a plurality of cross members transversely connected with each said side member, and a front bumper covering a frontmost portion of said front frame structure absorbing an impact in an event of collision, comprising:

a front cross member interposed between said front bumper and each said side member at a front end thereof for effectively absorbing said impact by a buckling deformation of said front cross member; and an aluminum foam contained in each said side member.

2. A front frame structure of a vehicle having, a side member longitudinally provided on the left and right sides of said vehicle respectively, a plurality of cross members transversely connected with each said side member, and a front bumper covering a frontmost portion of said front frame structure for absorbing an impact in an event of collision, comprising:

at least one impact absorption frame connected with the front end of at least one said side member;

a front cross member interposed between said front bumper and said impact absorption frame at a front end thereof; and an aluminum foam contained in said impact absorption frame.

3. A front frame structure of a vehicle having, a side member longitudinally provided on the left and right sides of said vehicle respectively, a plurality of cross members transversely connected with each said side member, and a front bumper covering a frontmost portion of said front frame structure for absorbing an impact in an event of collision, comprising:

a supporting plate connected to the front end of each said side member;

at least one impact absorption frame connected with the front end of at least one said side member such that the rear end thereof has a contact with said supporting plate;

a front cross member interposed between said front bumper and the front end of said impact absorption frame; and an aluminum foam contained in said impact absorption frame such that the rear end thereof has a contact with said supporting frame.

4. The front frame structure acording to claim 1, further comprising:

an impact sensor embedded in said aluminum foam so as to detect an impact.

5. The front frame structure according to claim 2, further comprising:

an impact sensor embedded in said aluminum foam so as to detect an impact.

6. The front frame structure acording to claim 3, further comprising:

an impact sensor embedded in said aluminum foam so as to detect an impact.

7. The front frame structure according to claim 1, further comprising:

a second aluminum foam provided in said front cross member.

8. The front frame structure according to claim 2, further comprising:

a second aluminum foam provided in said front cross member.

9. The front frame structure according to claim 3, further comprising:

a second aluminum foam provided in said front cross member.

10. The front frame structure according to claim 2, wherein said impact absorption frame is made of a thin-walled aluminum pipe.

11. The front frame structure according to claim 3, wherein said impact absorption frame is made of a thin-walled aluminum pipe.

12. The front frame structure according to claim 2, wherein said impact absorption frame is made of a thin-walled steel pipe.

13. The front frame structure according to claim 3 wherein said impact absorption frame is made of a thin-walled steel pipe.

14. The front frame structure according to claim 2, wherein said impact absorption frame comprises a pipe-shaped hollow provided at the rear half thereof and a U-shaped channel provided at the front half thereof;

said aluminum foam is formed by adding a foaming agent to melted aluminum within said pipe-shaped hollow;

said impact absorption frame is jointed by mechanical fasteners to said side member at said pipe-shaped hollow thereof; and said front cross member is jointed by mechanical fasteners to said U-shaped channel.

15. The front frame structure according to claim 2 wherein said impact absorption frame comprises a pipe-shaped hollow provided at the rear half thereof and a U-shaped channel provided at the front half thereof;

said aluminum foam is formed by adding a foaming agent to melted aluminum within said pipe-shaped hollow;

said impact absorption frame is jointed by welding to said side member at said pipe-shaped hollow thereof; and said front cross member is jointed by welding to said U-shaped channel.

16. The front frame structure according to claim 3, wherein said impact absorption frame comprises a pipe-shaped hollow provided at the rear half thereof and a U-shaped channel provided at the front half thereof;

said aluminum foam is inserted in said pipe-shaped hollow after being cut into a size fit for being contained in said pipe-shaped hollow and then supported by said supporting plate from behind;

said impact absorption frame is jointed by mechanical fasteners to said side member at said pipe-shaped hollow thereof; and said front cross member is jointed by mechanical fasteners to said U-shaped channel.

17. The front frame structure according to claim 3, wherein said impact absorption member comprises a pipe=shaped hollow provided at the rear half thereof and a U-shaped channel provided at the front half thereof;

said aluminum foam is inserted in said pipe-shaped hollow after being cut into a size fit for being contained in said pipe-shaped hollow and then supported by said supporting plate from behind;

said impact absorption frame is jointed by welding to said side member at said pipe-shaped hollow thereof; and said front cross member is jointed by welding to said U-shaped channel.

18. The front frame structure according to claim 4, wherein said impact sensor is imbedded in a rear end portion of said aluminum foam.

19. The front frame structure according to claim 5, wherein said impact sensor is imbedded in a rear end portion of said aluminum foam.

20. The front frame structure according to claim 6, wherein said impact sensor is imbedded in a rear end portion of said aluminum foam.

21. The front frame structure according to claim 1, wherein said front cross member is made of aluminum.

22. The front frame structure according to claim 2, wherein said front cross member is made of aluminum.

23. The front frame structure according to claim 3, wherein said front cross member is made of aluminum.

* * * * *